United States Patent [19]

Hofmann et al.

[11] 4,436,898
[45] Mar. 13, 1984

[54] PREPARATION OF SPINNABLE POLYAMIDE FROM DINITRILE, DIAMINE, H₂O WITH P CONTAINING CATALYST

[75] Inventors: Hansdieter Hofmann, Karben; Hans-Jochen Rothe, Maintal; Georg Skupin, Bruchkobel; Konrad Wolff, Frankfurt am Main, all of Fed. Rep. of Germany

[73] Assignee: Davy McKee Aktiengesellschaft, Borsigalle, Fed. Rep. of Germany

[21] Appl. No.: 375,971

[22] Filed: May 10, 1982

Related U.S. Application Data

[63] Continuation-in-part of Ser. No. 370,271, Apr. 20, 1982, abandoned, which is a continuation-in-part of Ser. No. 264,982, May 18, 1981, abandoned.

[51] Int. Cl.³ ............................................. C08G 69/00
[52] U.S. Cl. .................................... 528/336; 524/606; 524/608; 524/845; 526/65; 526/68; 526/71; 528/335; 528/337; 528/346; 528/347
[58] Field of Search .................... 528/336; 526/65, 68, 526/71; 524/606, 608, 845

[56] References Cited

U.S. PATENT DOCUMENTS 2,245,129  6/1941  Greenewalt .......................... 528/336
3,847,876  11/1974  Onsager ................................ 526/71

*Primary Examiner*—Harold D. Anderson
*Attorney, Agent, or Firm*—Allegretti, Newitt, Witcoff & McAndrews, Ltd.

[57] ABSTRACT

Production of spinnable polyhexamethylene adipamide of high molecular weight from adiponitrile, hexamethylene diamine, water and additives, preferably continuously in a reaction cascade and in a finisher as the final stage, catalytically accelerated by catalysts as disclosed.

It has now been discovered that polyamides can be produced from dinitriles, diamines and excess water in the presence of catalysts selected from the group consisting of: (1) oxygen-containing phosphorous compounds; (2) oxygen-containing boron compounds; (3) acidic oxygen-containing sulfur compounds; and (4) hydrogen halide and ammonium or ammonium alkyl salt thereof.

28 Claims, 1 Drawing Figure

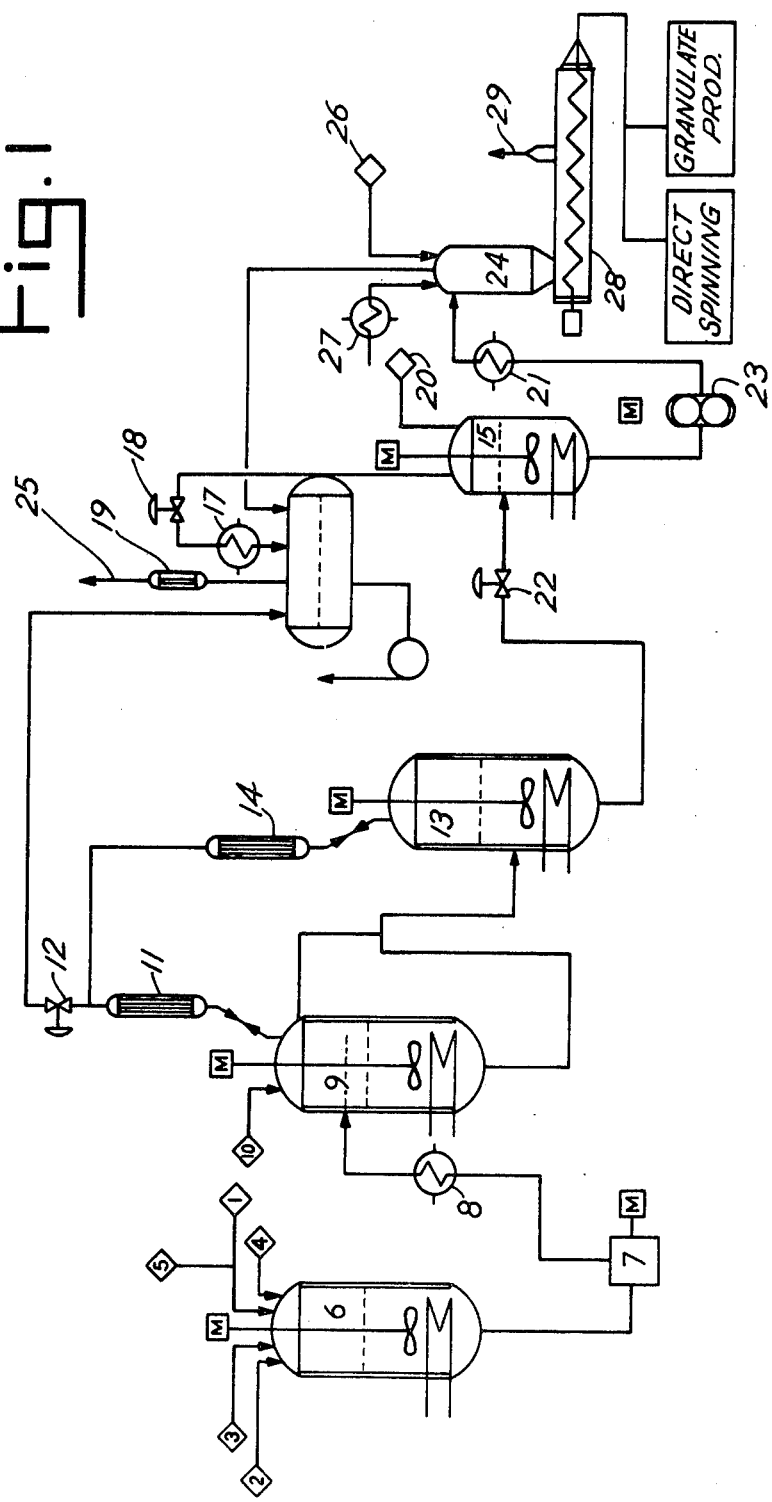

PREPARATION OF SPINNABLE POLYAMIDE FROM DINITRILE, DIAMINE, H₂O WITH P CONTAINING CATALYST

REFERENCE TO RELATED APPLICATION

This is a continuation-in-part of co-pending application Ser. No. 370,271, filed on Apr. 20, 1982, which is a continuation-in-part of application Ser. No. 264,982, filed on May 18, 1981, both now abandoned.

BACKGROUND OF THE INVENTION

The present invention relates to a method for producing spinnable polyamides of the so-called nylon by a conversion and polycondensation of dinitriles with aliphatic $\alpha,\omega$-diamines and excess water in the presence of catalysts of an inorganic or organic nature in catalytic quantities.

The method disclosed herein is utilized for the continuous production of polyhexamethylene adipamide, Nylon-6.6, from adiponitrile and hexamethylene diamine in the presence of ammonia-containing water and small quantities of catalysts preferably oxygen-containing compounds of phosphorous which exert an accelerating influence on the total kinetics of the process, thereby facilitating a higher degree of polymerization and/or reduction in the time required for said polymerization.

Up to now, adipic acid, that could be produced only from aromatics, has been used to produce polyamides. A separate saponification of adiponitrile into adipic acid is bothersome, does not proceed well quantitatively and is therefore not considered practical. At present, adiponitrile can be produced considerably more economically electrochemically from propylene or acrylonitrile as well as catalytically by the conversion of butadiene and hydrogen cyanide on a large scale and with high purity.

At the present time, adipic acid is shipped by costly transport means, in solid form and hexamethylene diamine in a liquified state with a small amount of water in separate containers or a neutralized solution of adipic acid and hexamethylene diamine, each approximately in a 60% concentration, is shipped in heated tank cars. Aside from the difficulties in connection with longer distances, the co-shipping of approximately 40% water is costly.

The shipping of solid salt from equimolar quantities of adipic acid and hexamethylene diamine, the so-called AH-salt, does not eliminate the above difficulties. This is due to the fact that the AH-salt must be obtained in a costly manner with respect to energy by evaporation or precipitation from water or methanol. For further processing, again, a 60% AH-salt solution, increased by the water from the reaction, must be evaporated during the polycondensation.

Literature on the reaction between adiponitrile, hexamethylene diamine and water in excess does not mention an efficient technical process for the reaction. Thus, in Greenewalt, U.S. Pat. No. 2,245,129, a total reaction time of more than 20 hours is required for a conversion as in example II therein. Also, in Onsager, U.S. Pat. No. 3,847,876, all disadvantages, which would be alleviated by an economical, continuous working method, are not eliminated, especially because Onsager calls for a minimum content of 1% of free ammonia in the reaction product. Thus, in examples 1-10 therein, which led to spinnable products, total reaction times of more than 8 hours were required. By a recycling, as in example 3 therein, a residence time spectrum was brought about and reached, which was unfavorable and undesirable for polyhexamethylene adipamide.

From experience it has been known that, based on the thermal instability of polyhexamethylene adipamide, short residence time and good residence time spectra are desirable, in all phases of the method, and which become more critical with an increasing degree of polycondensation and with increasing temperatures. It is with this background that the present invention was developed.

SUMMARY OF THE INVENTION

It is an object of the present invention to provide a method for the production of spinnable polyamides, specifically spinnable polyhexamethylene adipamide of high molecular weight from adiponitrile, hexamethylene diamine, water and additives, preferably continuously in a reaction cascade and in a finisher as the final stage, accelerated by catalysts, and such conditions of reaction, which will produce less than 1% of free ammonia in the reaction product at a temperature of more than 225° C.

It is a further object of the present invention to provide an economical method for the production of spinnable polyhexamethylene adipamide which avoids the use of adipic acid and uses, instead, adiponitrile that is economically produced from reasonably priced raw materials, such as propylene and butadiene.

Another object of the present invention is to provide a method for the production of spinnable polyhexymethylene adipamide which utilizes equimolar mixtures of adiponitrile and hexamethylene diamine which are in a liquid state at room temperatues with the addition of a small amount of water and which can be shipped conveniently over long distances with minimal ballast.

It is yet another object of the present invention to provide a method for the production of spinnable polyhexamethylene adipamide which is more economical than previous methods with respect to energy requirements and reactant requirements. This fact becomes apparent in light of the following comparisons and examples:

(a) Per ton of polyhexamethylene adipamide, approximately 1,160 kg AH-salt is required but only 992 kg of an equimolar mixture of adiponitrile and hexamethylene diamine is required.

(b) Per ton of polyhexamethylene adipamide, there are formed according to the method as defined in the present invention, approximately 150 kg of ammonia, gaseous or in watery solution, which, as a salable by-product, helps to lower the production costs (use, for instance, for fertilizers).

(c) Per ton polymexamethylene adipamide, there must be evaporated, according to the conventional manner (starting from 60% AH-salt solution), about 930 kg of water during the polycondensation. According to the method as defined in the present invention, only approximately 130 kg water and 150 kg ammonia have to be evaporated for the same quantity of polyamide.

Still another object of the present invention is to provide a method for the production of spinnable polyhexamethylene adipamide, which utilizes ammonia-containing water and the addition of catalysts preferably oxygen-containing compounds of phosphorus, of varying amounts in the form of esters, acids, or their salts, preferably their ammonium salts, to exert an accelerating and stabilizing influence on the total reaction. Typical of such oxygen-containing compounds of phosphorus so utilized are hypophosphorous acid, phosphorous acid, phosphoric acids and phosphonic acids, which are advantageously added in the form of esters, acids or as ammonium salts in water solutions. Good results are also being achieved with catalysts selected from derivatives of sulfuric acid, sulfonic acids, boric acid, hydrogen halogen acids and strong organic acids. Catalyst quantities, which are effectively added range from 0.005 to 0.5 weight percent of an equimolar mixture of adiponitrile and hexamethylene diamine. Larger quantities are possible, but do not show any additional advantages.

Yet another object of the present invention is to provide a method for the production of spinnable polyhexamethylene adipamide in which chain controllers in the form of monocarboxylic acids of monamines, in quantities of 2–30 mmol per kg of an equimolar mixture of adiponitrile and hexamethylene diamine, are added at the start of the reaction for the stabilization of the polymer melt so that there is a constant melt viscosity during the later processing operations. As monocarboxylic acids, for example, acetic acid, propionic acid or benzoic acid can be used. Of the monoamines, butylamine, n-hexylamine, n-octylamine and cyclohexylamine are recommended.

An object supplementary to the present invention is the stabilization of the spinnable polyhexamethylene adipamide against light and heat attack depending on the application desired. In particular its use for technical yarns and tire cord requires good stabilization of the polymeric mass and formed fibers against heat and oxygen by adding well-known heat stabilizers such as diarylamines, N-substituted p-phenylene-diamines, mercaptobenzimidazoles, copper salts and iodine compounds either alone or in the form of mixtures. Addition may take place prior, during or on completion of the reaction.

In a principal aspect, the present invention relates to the multi-stage conversion of adiponitrile and hexamethylene diamine in the presence of excess water which takes place according to the following summation reaction:

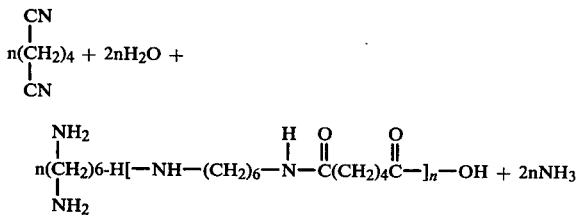

Intermediate products of a low molecular weight are formed from the addition and conversion of nitrile groups with water into different acid amides, for instance, δ-cyanovaleric acid amide and adipic acid diamide. When the reaction conditions, as defined in the present invention and described further hereinafter, are observed, pure adiponitrile is completely converted and disappears after a short reaction period without noteworthy development of ammonia. The acid amides and nitrile amides which formed then react in the form of a transamidation with the amino groups of hexamethylene diamine, forming ammonia, and then reacting further to aminoalkylated acid amides and to the initial polyamide products. A certain part of the saponifications of the nitrile groups or the resulting acid amides into the corresponding acids or ammonium salts is also feasible. As the thermally most unstable compound in this process, the adiponitrile can easily react, intramolecularly, to 2-cyanocyclopentanoneimine which leads to gels and discolorations by further undesirable reactions.

Suprisingly it has been further found, in contrast to the teachings of Onsager, that utilizing the conditions according to the present invention, i.e. using an autogenous pressure of 22–24 bar and the preferred temperatures of more than 225° C., always less than 1% free ammonia is present in the reaction product. Because of the physical conditions according to the present invention, only an ammonia content of 0.30 to 0.45% can be present during the pressure phase in the reaction product. Higher ammonia contents as expressly required by Onsager necessitate higher pressure, i.e. 30 bar as a minimum and temperatures lower than 225° C. at the beginning of the reaction.

The advantages, from an economical point of view, are, with the process according to the present invention, quite obvious, as a maximum pressure up to 25 bar and therefore less expensive equipment, shorter reaction times, better product qualities, and less waste water are utilized or obtained.

These and other objects, advantages and features of the invention will be set forth in the detailed description which follows:

BRIEF DESCRIPTION OF THE DRAWING

FIG. 1 is a flow diagram of the process disclosed herein for the production of spinnable polyamides.

DETAILED DESCRIPTION OF THE PREFERRED EMBODIMENT

As detailed in FIG. 1, hexamethylene diamine 2 and adiponitrile 3 are fed continuously in equimolar quantities into a heatable preparation boiler 6. At the same time, a catalyzer solution 1, approximately 10% in water, and demineralized water 5 or ammonia-containing water 4 are stirred in. The homogeneous mixture is continuously heated by means of a controllable piston pump 7, by way of a heat exchanger 8, to approximately 220° C. and is led to the first stage 9 of the reaction cascade. At a controlled reaction temperature of approximately 245° C. and a reaction pressure of 24 bar, gaseous ammonia and water, which are carried along according to partial pressure, escape through the relief valve 12 by way of the dephlegmator 11. The water is condensed to a great extent by the dephlegmator 11 and returned to the reactor 9. The dephlegmator 11 is operated at a temperature of approximately 45° C.

If necessary, pigments, preferably as titanium dioxide, may be added as prepared suspensions in adiponitrile or mixtures of adiponitrile and water as 10–40% suspension concentrates. The pigments are led to the first stage 9 of the reaction cascade by way of line 10 along with dispersion agents, which may be polymetasilicates, polyphosphates or polyvinyl alcohols. The pigment concentrations are preferably 0.1–3 mass %.

Because of the difference in the levels of the reaction cascade, the partially converted reaction product enters continuously into the second stage 13 of the reaction cascade with equal pressure. Further heating of the reaction mass to 270° to 280° C. takes place in the second stage 13.

Released ammonia and water flow from the second stage 13 to the common relief valve 12 also by way of a dephlegmator 14. The water is condensed for the greatest part by the dephlegmator 14 and then travels again to the reactor 13. The working temperature of the dephlegmator 14 is at approximately 55° C. Released ammonia and also water, in small quantities, flow by way of a condensing receiver 16, with an attached cooler 19, at a temperature of approximately 35° C., to a separate ammonia recovery 25.

The polyamide precondensate from the second stage 13 of the reaction cascade flows by way of a controlled relief valve 22 into a stirred polycondensation reactor 15, which has a working pressure of between 1.5 and 3 bar, to which unsaturated $H_2O$ vapor or inert gases 20 can be added. Ammonia is released from the reactor 15 and flows jointly with excess water to the descending cooler 17 by way of the relief valve 18 and subsequently flows into the condensating receiver 16. The ammonia, which is not dissolved under normal pressure in the process, escapes together with the ammonia from the reaction cascade to the ammonia recovery 25 by way of the rising cooler 19.

In a finisher, the reaction mass, which has nearly been converted in the polycondensation reactor 15 at 285° C., is subsequently put into the desired final state, which is chosen depending on the degree of polymerization desired. For this purpose, the polyamide mass present in the polycondensation reactor 15 is continuously discharged by means of a gear pump 23 and, by means of the heat exchanger 21, is brought to temperatures between 290° and 300° C. and led to a finisher system which consists of an expansion vessel 24 attached for final relief of the rest of the volatile compounds, connected to a screw reactor 28. In the expansion vessel 24, heated up inert gases 27, in form of pure nitrogen or unsaturated water vapor, can be added in order to accelerate the rest of the polycondensation, and further additives can be added by the line 26.

In the present invention, a double screw reactor 28 with an additional degassing zone 29 is used. Depending on the intended use, the polyamide product has adjustable relative solution viscosities between $n_{rel.}$ 2.3–3.2. (The relative solution viscosity is measured here in a concentration of 1 g/100 ml, 96% sulfuric acid at 25° C.) The spinnable polyamide melt produced in the finisher can be led to the usual granulate production as well as to a direct spinning process.

For the following applications, the following relative solution viscosities are common for polyhexamethylene adipamide:

|   | rel. visc. |
|---|---|
| (a) textile filaments | 2.4–2.6 |
| (b) carpet yarn | 2.7–2.8 |
| (c) technical filaments and tire cord | 2.8–3.2 |

In addition to its use as a fiber, these polyamides can be used in any other application calling for the use of a nylon-type polymer. For example, these polyamides can be used as plastics, films and molding compounds.

The diamines suitable for use in this reaction are the diamines containing from 1 through 20 carbon atoms. The diamines may be aliphatic, straight chain or branched, or aromatic or they may contain a hetero-atom. Also useful are substituted diamines, provided the substituents are inert under the reaction conditions. Preferably the diamines are the aliphatic or aromatic diamines which contain from 4 through 12 carbon atoms such as hexamethylene diamine, 1,4-diaminobutane, 1,5-diaminopentane, 1,8-diaminoctane, 1,10-diaminodecane, 1,12-diaminododecane, 2,5-dimethylhexane—2,5 diamine 4,4'-diaminodicyclohexylsulfur, p-diaminodicyclohexylmethane, 4,4'-diaminodicyclohexylether, octamethylenediamine, tetramethylenediamine and the like, i.e. diamines of the formula:

$$R'HN-R''-NHR'$$

wherein R'' is an alkylene or arylene group containing 4 to 12 carbon atoms and each R' is independently hydrogen or a univalent organic radical. The most preferred diamine is an $\alpha,\omega$ aliphatic diamine.

The dinitriles which can be used in accordance with the inventive reaction are dinitriles containing from 2 through 20 carbon atoms. These dinitriles may be aliphatic, straight chain or branched, or aromatic or they may contain a hetero-atom. Also useful are substituted dinitriles so long as the substituents are inert under the reaction conditions. Most preferably, however, the dinitriles are the aliphatic or aromatic dinitriles which contain from 4 through 12 carbon atoms, such as adiponitrile, succinonitrile, glutaronitrile, suberonitrile, sebaconitrile, 1,10-decanedinitrile, isophthalonitrile, terephthalonitrile and the like; i.e. dinitriles of the formula:

$$NC-R-CN$$

wherein R is an alkylene or arylene group of 2 to 10 carbon atoms.

The oxygen-containing phosphorous catalysts described above also include alkyl or aryl phosphinic acid and alkyl or aryl phosphonic acid or their esters or ammonium or ammonium alkyl salts thereof. In addition catalysts selected from the group consisting of (1) an oxygen-containing boron compound, (2) an acidic oxygen-containing sulfur compound and (3) a hydrogen halide or ammonium and ammonium alkyl salts thereof have been found to be useful in this process.

As discussed above, it is preferred commercially to run this process continuously, in a reaction cascade under the dislcosed reaction conditions. However, the reaction can also be performed with very simple equipment under a broad range of process conditions.

This reaction is normally carried out in a pressure vessel in the absence of air. The reaction is also normally initially carried out at superatmospheric pressure with a later reduction to atmospheric pressure. It is preferable to then remove the excess water and ammonia from the reaction system by either reducing the pressure to subatmospheric pressure or by adding an inert gas. During this polymerization it is preferable to release the ammonia while at least initially maintaining some or all of the water in the reaction system. This can be accomplished, for example, by the use of return flow coolers.

The method as defined in the present invention is better understood with reference to the following examples.

EXAMPLES 1-18

Equimolar quantities of adiponitrile and hexamethylene diamine, partly varying quantities of water, and catalytic quantities of inorganic or organic compounds, as detailed in TABLE 1, with 100 ppm silicon-antifoam additive, were put into a stirring autoclave of stainless steel having a volume of 2 liters and were mixed. The autoclave was provided with a dephlegmator and, after a pressure relief valve, with a descending cooler and was steplessly heated continuously and controllably with a heat transfer oil. Before the start of each test, the filled autoclave was rinsed with nitrogen several times and subsequently put into a pressureless state.

With continuous stirring, the reaction mixture in the autoclave was heated in such a way that a product temperature of 225° C. was reached within 45 minutes. The autogenous pressure was then between 22-24 bar. During a pressure period of 50 minutes, further heating was done, the developed ammonia being continuously released via the dephlegmator. Simultaneously, evaporated water was returned as dephlegmate into the autoclave.

After a further 135 minutes, a product temperature of 275°-285° C. was reached. After that a pressure relief period followed during which the pressure was lowered from 22-24 bar to 1 bar within 60 minutes. Thereupon, an equalization period of 45 minutes followed with the subsequent emptying of the autoclave contents being accomplished by pressing out with excess nitrogen pressure.

As far as possible, the obtained polyamides were granulated, dried and analyzed. The obtained degree of polymerization was calculated by the determination of the relative viscosity of the solution. (Polyamide concentration: 1 g polyamide was dissolved in 100 ml 96% sulfuric acid and the viscosity measurement was carried out at 25° C. in an Ubbelohde viscosimeter). The results of the examples are found in TABLE 1.

EXAMPLE 19

From a preparation vessel blanketed with purified nitrogen, a homogenous mixture of

| | |
|---|---|
| 38.0% | adiponitrile |
| 40.8% | hexamethylenediamine |
| 21.1% | water |
| 0.1% | phosphorous acid | is, at a rate of 1 kg/h, continuously fed to a reaction cascade using a metering pump. The reaction cascade consists of two 2-1 mixing reactors whose respective filling level amounts to 75%. Both mixing reactors are equipped with partial condensers and a joint gas system. They may be operated at different temperatures, their filling levels being, however, identical.

During continuous operation, the following parameters require to be observed:

| | | |
|---|---|---|
| Reactor I | Pressure | 24 bar |
| | Temperature | 242° C. |
| | Dephlegmator temperature | 55° C. |
| Reactor II | Pressure | 24 bar |
| | Temperature | 265-270° C. |
| | Dephlegmator temperature | 90° C. |

After cooling to 30° C., the ammonium gas stream from Reactor I and II amounts to approximately 173 l/h.

The reaction product obtained from Reactor II is continuously fed to a mixing vessel heated to 280° C. releasing the pressure to 5-6 bar, while the water vapours forming are condensed with the aid of a descending cooler.

From the mixing vessel, a clear colourless pre-polycondensate is periodically withdrawn, which then solidifies to a white mass of $n_{rel.}$ approximately 1.8.

As is well known, this pre-polycondensate may be further polymerized, either continuously or discontinuously, to form spinnable highly molecular polyhexamethylene adipamide.

Moreover, it is also well possible to polymerize it by way of solid-state polycondensation.

It should be understood that the foregoing disclosure emphasizes certain specific embodiments of the invention and that all modifications or alternatives equivalent thereto are within the spirit or scope of the invention as set forth in the appended claims.

TABLE 1

| Test No. | Parts Adiponitrile | Parts Hexamethylene diamine | Parts Water | Dephlegmator | Catalyzer type | Parts Catalyzer | Pressure in bar | Rel. Viscosity | Rel.Viscosity according to ASTM | Spinnable |
|---|---|---|---|---|---|---|---|---|---|---|
| 1 | 216 | 232.4 | 366 | — | — | — | 22 | 2.15 | 24.5 | conditional |
| 2 | 216 | 232.4 | 366 | — | phosphoric acid | 0.15 | 22 | 2.50 | 41.5 | good |
| 3 | 216 | 232.4 | 366 | — | phosphoric acid | 0.15 | 22 | 2.53 | 42.7 | good |
| 4 | 216 | 232.4 | 366 | — | phosphoric acid | 0.15 | 22 | 2.52 | 42.0 | good |
| 5 | 216 | 232.4 | 120 | — | — | — | 22 | 1.25 | — | no |
| 6 | 216 | 232.4 | 120 | + | 13 | — | 22 | 2.20 | 28.0 | conditional |
| 7 | 216 | 232.4 | 120 | + | phenyl-phosphonic acid | 0.25 | 22 | 2.60 | 46.5 | good |
| 8 | 216 | 232.4 | 180 | + | di-ammonium phosphate | 0.15 | 22 | 2.75 | 55.0 | good |
| 9 | 216 | 232.4 | 180 | + | triphenyl-phosphate | 0.45 | 22 | 2.65 | 49.5 | good |
| 10 | 216 | 232.4 | 125 | + | without | — | 22 | 1.95 | <20 | no |
| 11 | 216 | 232.4 | 125 | + | 4-toluene-sulfonic acid | 0.72 | 24 | 2.50 | 41.5 | good |

TABLE 1-continued

| Test No. | Parts Adipo-nitrile | Parts Hexa-methylene diamine | Parts Water | Dephleg-mator | Catalyzer type | Parts Catalyzer | Pressure in bar | Rel. Viscosity | Rel. Viscosity according to ASTM | Spinnable |
|---|---|---|---|---|---|---|---|---|---|---|
| 12 | 216 | 232.4 | 125 | + | 2-naph-sulfonic acid thalene- | 0.81 | 24 | 2.51 | 42.0 | good |
| 13 | 216 | 232.4 | 125 | + | boric acid | 0.47 | 24 | 2.25 | 30.2 | good |
| 14 | 216 | 232.4 | 125 | + | oxalic acid | 0.70 | 24 | 2.22 | 29.0 | conditional |
| 15 | 216 | 232.4 | 125 | + | hydrogen iodide | 0.49 | 24 | 2.45 | 39.1 | good |
| 16 | 216 | 232.4 | 125 | + | ammonium sulfamate | 0.65 | 24 | 2.42 | 37.7 | good |
| 17 | 216 | 232.4 | 125 | + | ammonium iodide | 0.55 | 24 | 2.48 | 40.6 | good |
| 18 | 216 | 232.4 | 125 | + | benzene phosphinic acid | 0.58 | 24 | 2.51 | 42.1 | good |

We claim:

1. A method for the production of a spinnable polyamide comprising contacting a dinitrile, an aliphatic diamine, excess water and a catalytic amount of an oxygen containing phosphorous compound in a reaction vessel.

2. The method of claim 1 wherein the dinitrile is adiponitrile, the diamine is hexamethylene diamine and the spinnable polyamide is polyhexamethylene adipamide.

3. The method of claim 1 wherein the catalyst is selected from the group consisting of phosphoric acid, phosphorous acid, phenyl phosphonic acid, phenyl phosphinic acid, ammonium and ammonium alkyl salts thereof.

4. The method of claim 1 wherein the dinitrile, diamine, water and catalyst are converted into a spinnable polyamide approximately continuously in a reaction cascade in at least two stages, said reaction cascade being heated to a temperature of greater than 150° C. and thereby pressurized to a superatmospheric pressure.

5. The method of claim 1 wherein ammonia is continuously removed from the reaction vessel.

6. The method of claim 5 wherein excess water and ammonia are removed from the reaction vessel by either reducing the pressure to subatmospheric pressure or by adding an inert gas to accelerate the reaction.

7. The method of claim 1 wherein spinnable polyhexamethylene adipamide is produced from adiponitrile and hexamethylene diamine in contact with excess water at an elevated temperature and superatmospheric pressure, wherein said process comprises:
   (a) feeding continuously equimolar quantities of adiponitrile and hexamethylene diamine into a heatable preparation vessel, said vessel being at a temperature of greater than 30° C.;
   (b) introducing an excess of water into said vessel in contact with catalytically-acting quantities of at least one oxygen containing compound of phosphorous thereby forming an initial mixture consisting of adiponitrile, hexamethylene diamine, water and at least one oxygen containing compound of phosphorous;
   (c) converting approximately continuously said adiponitrile, said hexamethylene diamine and said water into precursors of polyhexamethylene adipamide by a polycondensation process in a reaction cascade in at least two stages; said reaction cascade being heated to a temperature of greater than 150° C. and thereby pressurized to a super-atmospheric pressure;
   (d) forming initial precursors of polyhexamethylene adipamide to a yield based upon the development of gaseous ammonia of more than 65 percent;
   (e) allowing the escape of said gaseous ammonia continuously at a superatmospheric pressure by means of return flow coolers;
   (f) relieving the pressure of said precursors of polyhexamethylene adipamide in a step-wise fashion;
   (g) heating said precursors of polyhexamethylene adipamide while said pressure is relieved to approximately atmospheric pressure; and
   (h) continuing said polycondensation process to remove excess water and ammonia thereby producing said polyhexamethylene adipamide, said polyhexamethylene adipamide having spinnable properties.

8. The method of claim 6 wherein said inert gas is nitrogen, water vapor or a mixture thereof.

9. The method of claims 4 or 7 wherein a pigment is added to said reaction cascade.

10. The method of claim 9 wherein said pigment is titanium dioxide.

11. The method of claim 9 wherein the pigment, a dispersing agent and adiponitrile are added in the form of a suspension.

12. The method of claim 9 wherein said dispersion agent is selected from the group consisting of polymetasilicates, polyphosphates and polyvinyl alcohols.

13. The method of claim 7 wherein said initial mixture contains 15 to 45 percent by weight of water based on the total weight of the adiponitrile, hexamethylene diamine and water.

14. The method of claims 4 or 7 wherein said reaction cascade functions without a recycle of the product.

15. The method of claim 7 wherein said process is conducted at a temperature between 220° C. and 300° C.

16. The method of claim 7 wherein the pressure is maintained above 20 bar until at least 65 mole percent of the adiponitrile has been converted into polyamide.

17. The method of claim 1 wherein means are provided for releasing produced ammonia while maintaining at least part of the water in the reaction system.

18. The method of claim 17 wherein said means are a return flow cooler.

19. The method of claim 1 wherein said catalyst is present in quantities of 0.001 to 1 weight percent based on the total weight of the diamine, dinitrile and water.

20. The method of claim 1 wherein a chain controller in concentrations of 1-40 mmol/kg of water-free starting mixture is added thereto.

21. The method of claim 20 wherein the chain controller is selected from the group consisting of monocarboxylic acids and monoamines or mixtures thereof.

22. The method of claim 1 wherein heat and light stabilizers are added thereto.

23. The method of claim 7 wherein said reaction takes place in the presence of less than 1 percent by weight of ammonia in the liquid phase.

24. The method of claim 7 wherein said reaction takes place in the substantial absence of ammonia in the liquid phase.

25. The method of claim 1 wherein said dinitrile is selected from the group consisting of succinonitrile, glutaronitrile, suberonitrile, sebaconitrile, 1,10-decanedinitrile, isophthalonitrile, and terephthalonitrile.

26. The method of claim 1 wherein said diamine is selected from the group consisting of 1,4-diaminobutane, 1,5-diaminopentane, 1,8-diaminoctane, 1,10-diaminodecane, 1,12-diaminododecane, 2,5-dimethylhexane—2,5-diamine, p-diaminodicyclohexylmethane, 4,4'-diaminodicyclohexylether, and 4, 4'-diaminodicyclohexylsulfide.

27. The method of claim 1 wherein the oxygen containing phosphorous compound is selected from the group consisting of hypo-phosphorous acid, phosphorous acid, phosphoric acids, phosphonic acids and ammonium salts of said acids.

28. The method of claim 1 wherein the oxygen containing phosphorous compound is selected from the group consisting of alkyl and aryl phosphinic acid, alkyl and aryl phosphonic acid, ammonium salts and ammonium alkyl salts of said acids.

* * * * *